Figure 5:
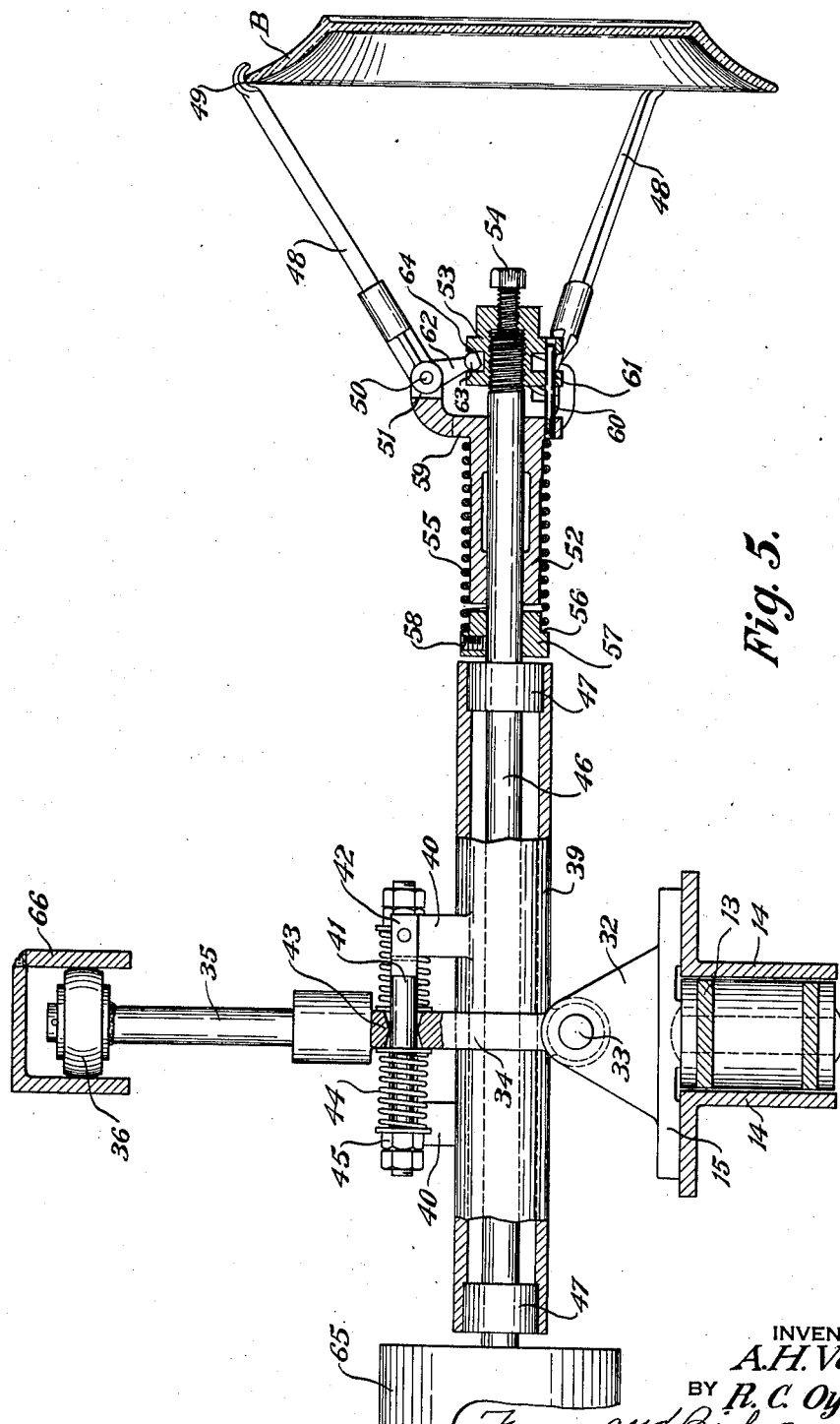

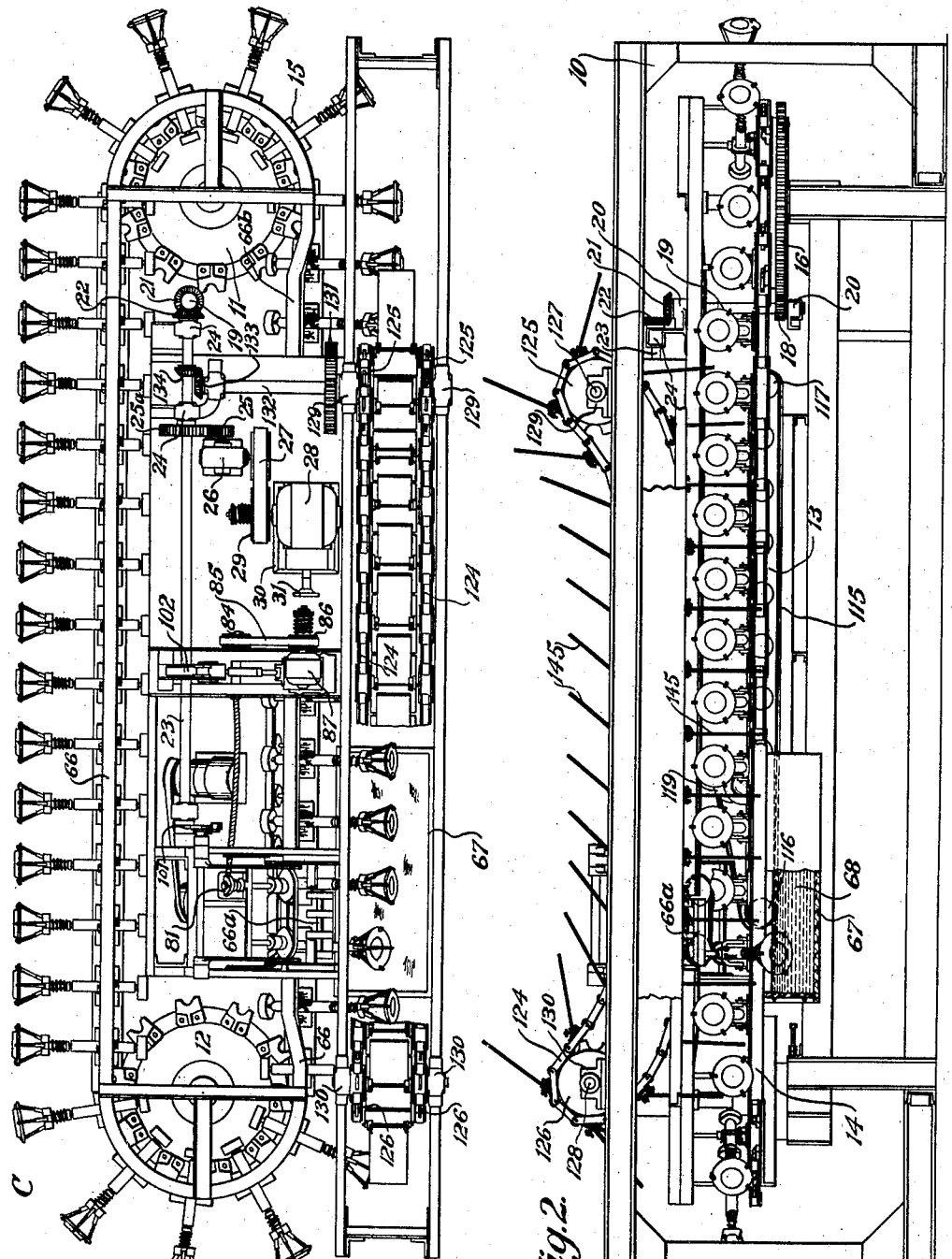

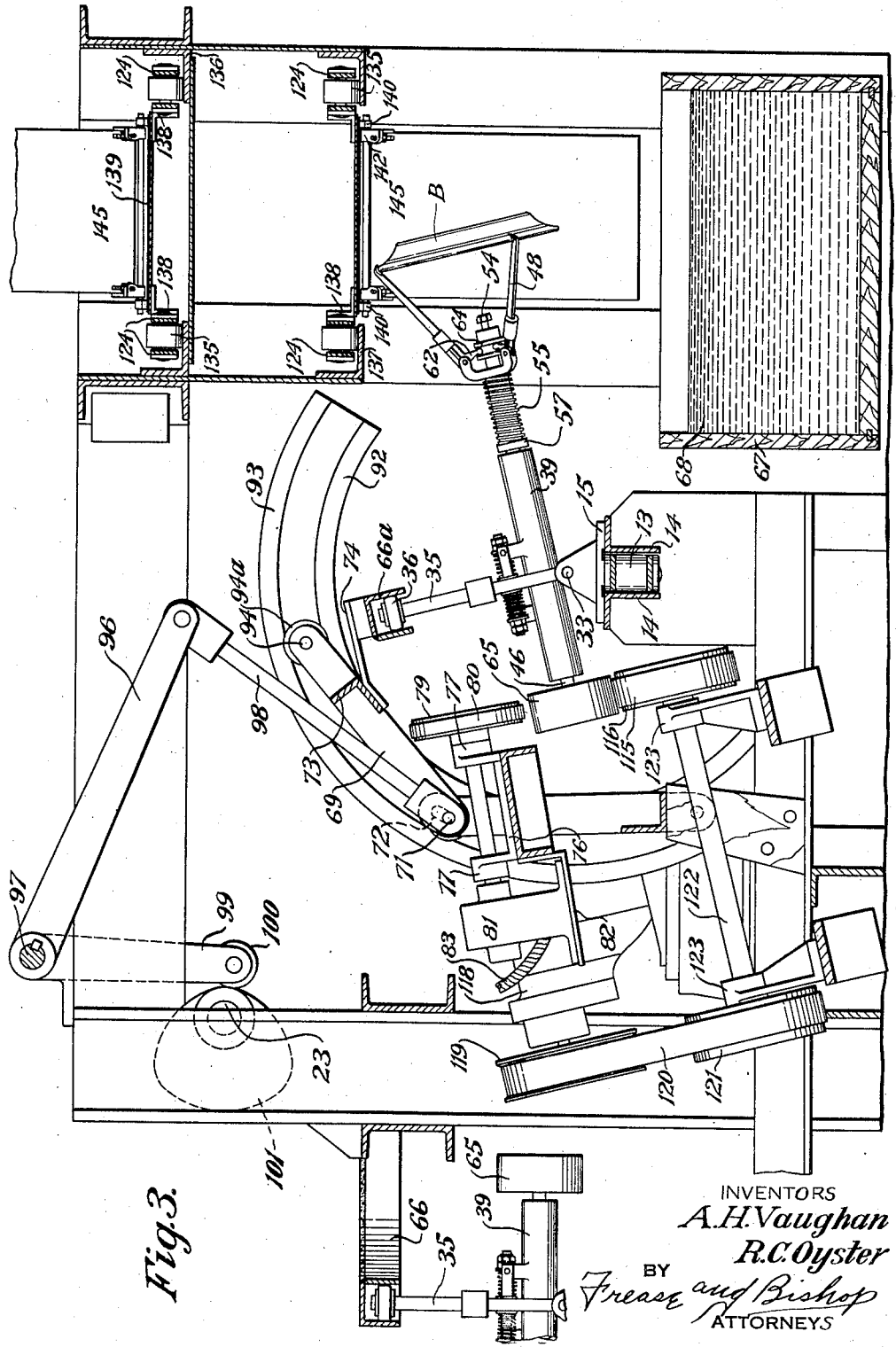

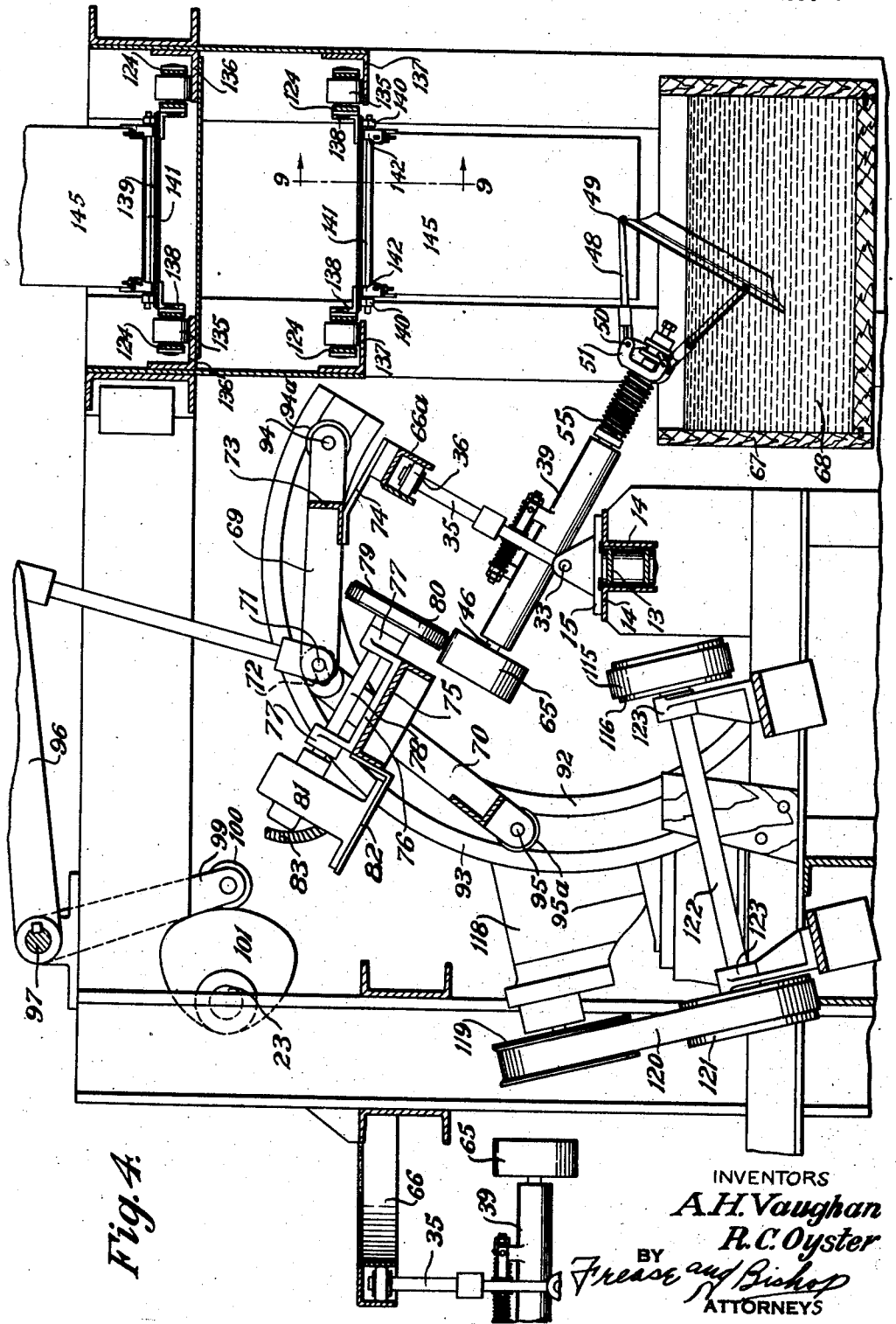

Oct. 23, 1934.  A. H. VAUGHAN ET AL  1,977,704
GLAZING MACHINE
Filed April 27, 1933   5 Sheets-Sheet 4

INVENTORS
A. H. Vaughan
BY R. C. Oyster
Frease and Bishop
ATTORNEYS

Oct. 23, 1934.    A. H. VAUGHAN ET AL    1,977,704
GLAZING MACHINE
Filed April 27, 1933    5 Sheets-Sheet 5

INVENTORS
A. H. Vaughan
R. C. Oyster
BY Frease and Bishop
ATTORNEYS

Patented Oct. 23, 1934

1,977,704

UNITED STATES PATENT OFFICE 1,977,704

GLAZING MACHINE

Arthur H. Vaughan and Ray C. Oyster, Salem, Ohio, assignors to Frank H. Sebring, Jr., Salem, Ohio Application April 27, 1933, Serial No. 668,167

20 Claims. (Cl. 91—42)

The invention relates to the coating of china or semi-porcelain dishes, plates and the like with a coating of liquid glaze such as is ordinarily applied to bisque ware and more particularly to an improved glazing machine by means of which the ware is automatically coated with the glaze and the surplus glaze is uniformly removed and the ware rapidly dried.

The object of the present improvement is to provide an apparatus including an endless carrier provided with a plurality of rotatable spindles having chucks or fingers for supporting the ware to be glazed, means being provided for continuously moving said carrier and successively tilting the spindles to dip the ware into a tank of liquid glaze, means being provided for rotating the spindles as the ware is dipped into the glaze and for increasing the speed of rotation and sustaining the same for some time after the ware has been dipped in order to remove the surplus glaze by centrifugal action, leaving a smooth uniform coating upon each piece of ware and causing the same to dry sufficiently to permit removal thereof from the chuck without marring the glaze surface.

Another object of the improvement is to provide a tilting frame having means thereon for tilting each spindle at a predetermined point in order to dip the ware carried thereby into a tank of liquid glaze, said tilting frame also carrying means for rotating the spindle as it is tilted and for increasing the speed of rotation as the spindle is moved back to the normal position.

A further object is to provide means for continuing the rapid rotation of each spindle after it has passed out of engagement with the rotating means carried by said tilting frame.

A still further object is to provide an endless carrier supporting a plurality of shields adapted to be positioned between the ware carried by the different spindles as the same is being rotated in order to prevent the excess glaze thrown off by each piece of ware from coming into contact with adjacent pieces of ware.

Another object of the improvement is to provide a simple and efficient chuck or clamping head upon each spindle for holding the ware during the dipping and drying operations, the chuck being adapted to be quickly and easily operated to place a piece of ware therein before dipping and to remove the ware therefrom after it has been dipped and dried.

Figure 8:
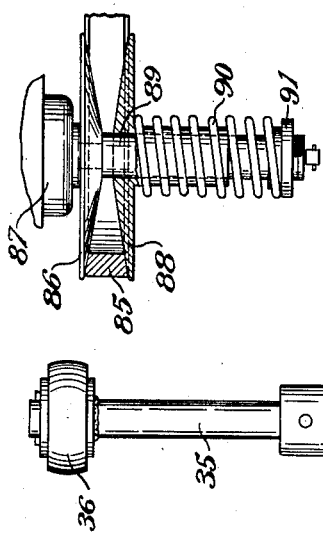
Figure 6:
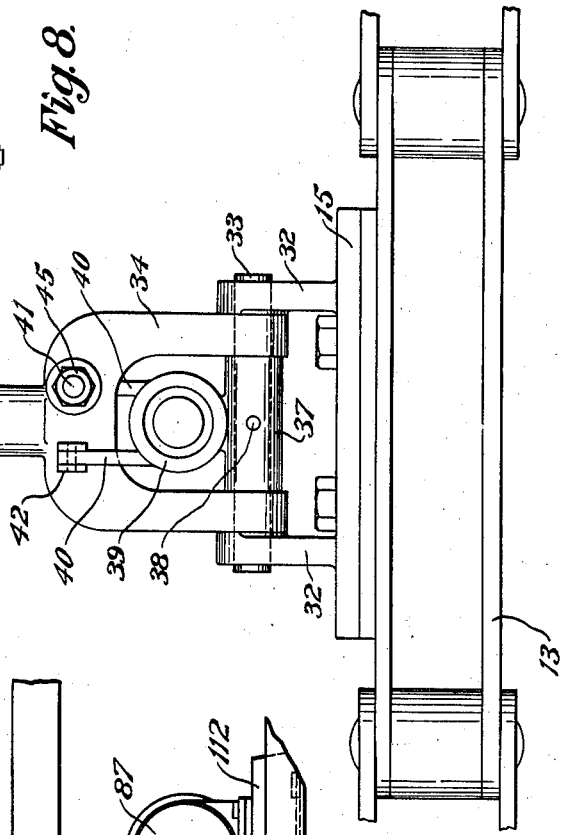
Figure 7:
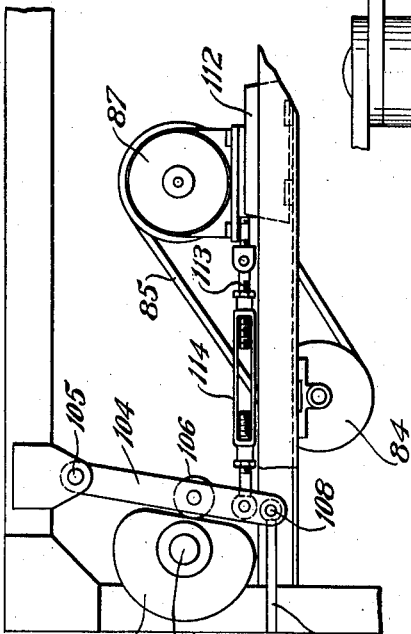

The above, together with other objects which will be later explained or which will be evident from the following descriptive specification and the accompanying drawings, may be attained by constructing the improved glazing machine in the manner illustrated in the drawings, in which Figure 1 is a top plan view of the improved glazing machine to which the invention pertains;

Fig. 2, a side elevation of the machine;

Fig. 3, an enlarged fragmentary transverse sectional view through the machine showing the tilting frame with the associated mechanism for tilting each spindle to dip the ware and for rotating the spindle during the dipping operation, these parts being shown in normal or inoperative position;

Fig. 4, a view similar to Fig. 3 showing the frame in the operative or tilted position with the spindle tilted to dip the ware into the glaze tank and the short drive belt in position to rotate the spindle during the dipping operation;

Fig. 5, a longitudinal sectional view of one of the spindles upon a still larger scale;

Fig. 6, an end view of the spindle shown in Fig. 5;

Fig. 7, a detail elevation of the variable speed driving mechanism for rotating the spindle during the dipping operation;

Fig. 8, an enlarged sectional elevation of the variable speed pulley; and

Figure 9:
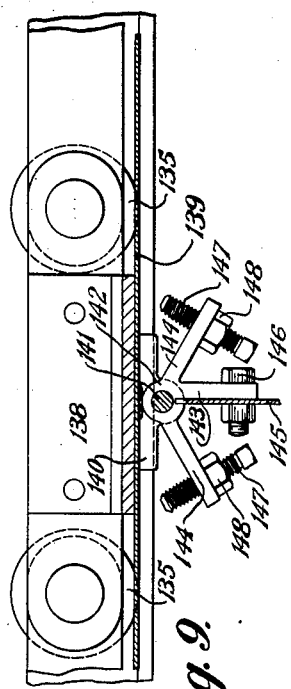

Fig. 9, a detail sectional view of the hinged bracket for supporting one of the shields, on line 9—9, Fig. 4.

Similar numerals refer to similar parts throughout the drawings.

The improved glazing machine may comprise a structural frame indicated generally at 10 near opposite ends of which are journaled the sprockets 11 and 12 arranged to rotate in a horizontal plane around which an endless chain indicated generally at 13 is located. This chain is supported between the sprockets in chain guides comprising spaced angle irons 14, each link of the chain having thereon a flat shoe 15 adapted to slide upon the top of the chain guides.

The sprocket 11 may be driven and for this purpose a gear 16 is fixed upon the sprocket and meshes with a pinion 18 fixed upon a vertical shaft 19 journaled in suitable bearings 20 in the frame and provided at its upper end with a bevel pinion 21 meshing with a bevel pinion 22 upon a shaft 23 journaled in bearings 24. The shaft 23 is driven as by the gear drive 25—25a through a gear reduction 26 which is connected by the belt drive 27 with the motor 28. The motor may be provided with a variable speed pulley 29 of well known design and may be slidably moved upon its base 30 as by a hand wheel 31 in order to vary the speed of rotation of the sprocket 11.

The shoe 15 upon each link of the chain 13 is made in the form of a bracket having spaced upright ears 32 thereon through which is journaled a short shaft 33. A forked or U-shaped bracket 34 is journaled upon the shaft 33 and has fixed thereto the upright rod or stem 35 upon the upper end of which is journaled a roller 36.

A collar 37 is fixed upon the shaft 33 between the depending legs of the fork 34, being pinned to the shaft as by the pin 38. The tubular spindle housing 39 is formed integral with the collar 37 and located at right angles thereto and is provided at points spaced from each side of the collar with the upright lugs 40 to which are pivoted rods 41 as indicated at 42, these rods being slidably located through oppositely flared openings 43 in the upper portion of the U-shaped member 34 and having coil springs 44 interposed between the U-shaped member and the heads 45 upon the ends of the rods 41, which heads may be in the form of nuts, as shown in Figs. 5 and 6, to permit adjustment of the tension upon the springs 44.

The spindle 46 is located longitudinally through the spindle housing 39, being journaled in the bearings 47 located in opposite end portions of the spindle housing. A chuck or clamping head is formed upon the outer end of each spindle and may comprise a plurality of fingers 48, preferably three as indicated in the drawings, each of which is provided at its outer end with a notch 49 to receive the peripheral edge of a plate or other piece of bisque ware to be dipped, as indicated at B.

Each of the fingers 48 is pivoted as at 50 to a suitable lug 51 upon the sleeve 52 which is slidably mounted upon the spindle 46 and normally urged outward toward the adjustable collar 53 fixed upon the outer end of the spindle and locked in position thereon as by a set screw 54. For the purpose of urging the sleeve outward upon the spindle, a coil spring 55 is interposed between the shoulder 56 upon a collar 57 fixed on the spindle as by a set screw 58, and the shoulder 59 upon the sleeve. The sleeve is prevented from rotating relative to the spindle as by means of a pin 60 carried by the sleeve and slidably located through an opening 61 in the collar 53.

The inner end of each finger 48 is provided with an angular extension 62 having a cylindric portion 63 upon its end located in a groove or socket 64 in the periphery of the collar 53. Thus, as the sleeve 52 is urged toward the outer end of the spindle, the fingers 48 are urged inward to grip the peripheral portion of the ware, as best shown in Fig. 5.

In order to separate the fingers to permit ware to be inserted or removed, one or more fingers may be swung outward upon its pivot 50, sliding the sleeve 52 backward and compressing the spring 55. As the ware is inserted into the notches 49 of the fingers and the backward pressure upon the fingers released, the spring 55 will move the sleeve 52 outward, causing the fingers to tightly grip the ware.

A friction pulley 65 is fixed upon the inner end of each spindle 46 for frictional engagement with belts for rotating the spindle during and immediately after the dipping operation, as will be later described.

The rollers 36 upon the stems 35 are arranged to travel in a substantially elliptic guide track 66 which is in the form of an inverted channel as best shown in Fig. 5, this track being supported in the frame at a point above the spindles so as to normally hold the spindles in substantially horizontal position, except at a point just prior to the dipping operation, and for some distance immediately succeeding the dipping operation, where the spindles are tilted upward during the spinning operation in order to quickly drain surplus water from the interior of cups and dished articles. This is accomplished by providing an offset portion 66b in the track 66.

At a point adjacent to the tank 67 in which the liquid glaze 68 is contained, the guide track is provided with a movable section 66a adapted to be tilted from the initial position shown in Fig. 3 to the operative position shown in Fig. 4, for the purpose of dipping the ware into the liquid glaze within the tank 67.

For this purpose a tilting frame is provided comprising the spaced pairs of links 69 and 70, each of the upper links 69 having a pin or stud 71 in its lower end engaged in the slot 72 in the upper end of the lower link 70.

The upper links 69 are connected together by a crossbar 73 to which the movable section of track 66a is connected as by a bracket 74. A crossbar 75, preferably in the form of a channel iron, connects the two lower links 70 and supports the bracket 76 upon which are provided spaced pairs of bearings 77 in which are journaled shafts 78 provided with pulleys 79 around which an endless belt 80 is located.

One of the shafts 78 is connected to reducing gears located in the housing 81 which is supported upon a bracket 82 carried by the crossbar 75. The reducing gears are driven by a flexible shaft 83 connected to a pulley 84 which is driven by a variable speed drive including the belt 85 connected to a pulley 86 located upon the shaft of a motor 87.

The pulley 86 has one flange 88 slidably mounted upon the shaft 89 and normally urged toward the motor by a coil spring 90 interposed between the flange 88 and a head 91 upon the outer end of the shaft 89. The belt 85 is wedge-shaped as shown in Fig. 8 to fit the inclined inner faces of the movable flange 88 and the fixed flange of the pulley.

It will be seen that as the belt is drawn toward the center of the pulley the movable flange 88 will be forced outward, against the pressure of the spring 90 and the belt will be driven at a lower speed while as the belt moves outward toward the periphery of the pulley, the spring 90 will urge the movable flange 88 inward against the belt and the belt will be driven at higher speed.

For the purpose of tilting the frame 69—70, the same is mounted in a pair of arcuate tracks, each of which comprises an inner rail 92 and an outer rail 93 centered around the pivotal point 33. Studs or rods 94 and 95 at the upper ends of the links 69 and lower ends of the links 70 respectively, are provided with rollers 94a and 95a respectively, which ride in the arcuate track 93 as well as a similar roller upon the studs 71.

The frame 69—70 is arranged to be tilted upon the rails 92—93 by means of a pair of rocker arms 96 fixed upon a rocker shaft 97 and pivotally connected to links 98 which are connected to the studs 71. Another rocker arm 99 is fixed upon the shaft 97 and may be provided at its lower end with a roller 100 riding upon the surface of the cam 101 fixed upon the shaft 23.

With each rotation of this shaft the rocker arm 99 will be moved to the position shown in Fig. 4, rocking the shaft 97 and with it the arm 96, moving the frame 69—70 to the position shown in said figure. The first movement of the arm 96 will slide the upper links 69 upward and forward, tilting the movable track section 66a and with it the spindle 46, moving the friction pulley 65 into contact with the short belt 80, starting the spindle to rotate.

As the stud 71 reaches the upper end of the slot 72, the lower links 70 will be carried upward and forward in unison with the upper links, tilting the pulleys 79 and belt 80 while the same is held in contact with the pulley 65 until the parts reach the position shown in Fig. 4 with the ware dipped into the tank of liquid glaze as it is rotated.

The tilting frame will then start to move back toward normal position, raising the ware out of the tank, at which time the speed of rotation of the spindle may be increased in order to cause the liquid glaze coating upon the ware to flow uniformly over the entire piece of ware and to throw off surplus liquid glaze. This is accomplished by means of the cam 102 also mounted upon the shaft 23 cooperating with a lever 104 fulcrumed at its upper end, as at 105, upon any stationary portion of the frame and provided with a roller 106 which rides upon the periphery of the cam 102.

The lower end of the lever 104 has a rod 107 pivotally connected thereto as at 108, said rod being slidably located through a bracket 109, a coil spring 110 surrounding the rod and being interposed between said bracket and the head 111 at the end of the rod, whereby the roller 106 is always held in contact with the periphery of the cam 102. The motor 87 is slidably mounted upon a base 112 and is connected, as by the link 113, to the lever 104. The link 113 may be provided with means for adjusting its length, such as the turn buckle 114.

As the cam 102 rotates, the lever 104 will be moved to slide the motor 87 upon its base 112. As the frame 69—70 is tilted back toward normal position, tilting the spindle therewith back to horizontal position and raising the ware out of the tank of liquid glaze, the cam 102 will be moved toward the position shown in Fig. 7, sliding the motor toward the pulley 84 and moving the belt 85 toward the periphery of the pulley 86, as shown in Fig. 8, rotating the pulley 84 at its maximum speed, thus gradually speeding up the rotation of the ware as it is moved out of the glaze tank in order to rapidly throw off the surplus glaze by centrifugal force.

For the purpose of maintaining the rotation of the spindles at high speed for some time after the dipping operation, a belt 115 is located over pulleys 116 and 117 and driven in a direction opposite to that of the short belt 80 and at a speed equal to the maximum speed attained by the belt 80. A motor 118 may be provided for driving this belt; a pulley 119 upon the motor being connected, as by the belt 120, to a pulley 121 upon the shaft 122 journaled in bearings 123 and carrying the pulley 116.

It will be seen that when the tilting frame returns to normal position, as shown in Fig. 3, the spindle which has just been dipped to the position shown in Fig. 4, will be tilted upward, as shown in Fig. 3. By means of the offset portion 66b of the track, each spindle is held in this backward tilted position during the spinning operation, in order to quickly drain surplus water from the interior of cups and dished articles which may be carried by the spindles.

In order to prevent surplus liquid glaze which is thrown off by the rapidly rotating ware from striking adjacent pieces of ware, shields are provided adapted to move in unison with the spindles and to hang between adjacent spindles, shielding the ware upon each chuck or head from any liquid glaze thrown off by the rotating ware upon adjacent chucks.

These shields may be carried upon the spaced pair of endless chains 124 located over sprockets 125 and 126 mounted upon the shafts 127 and 128 respectively, which are journaled in bearings 129 and 130 mounted upon the frame 10. The shaft 127 has a gear 131 thereon which meshes with a pinion (not shown) upon the shaft 132 upon the inner end of which is mounted a bevel pinion 133 meshing with a similar pinion 134 upon the shaft 23, whereby the sprockets 125 are driven by the motor 28.

The chains 124 are provided with rollers 135 which ride upon the spaced upper and lower angle iron tracks 136 and 137 respectively, and angle brackets 138 are connected to the inner sides of the links of said chains to which the normally horizontal sheet metal shields 139 are connected. Lugs 140 are also provided upon said angle brackets within which are journaled the shafts 141. Near each end portion of each shaft 141 is mounted a bracket indicated generally at 142 and having three spaced angular ears comprising the central ear 143 and the side ears 144.

A sheet metal shield 145 is connected at opposite corners to the central ears 143 as by the bolts 146 and a pair of adjustable stop screws 147 are located through the side ears 144 and provided with adjusting nuts 148 for holding the screws in adjusted position. As the chains pass along the tracks and over the sprockets, the stop screws 147 will limit the swinging movement of the shields in each direction.

The chains are so proportioned and positioned that as the spindles carrying the ware pass along through the dipping and spinning positions, one shield 145 is centrally positioned between each adjacent pair of spindles, as shown in Fig. 2, thus shielding each piece of ware from the surplus liquid glaze thrown off by the rapidly rotating ware upon each side thereof.

As the roller 65 upon each spindle passes beyond the pulley 117 and out of contact with the belt 115 the rotation ceases. The bisque ware to be glazed is charged at about the point C, as shown in Fig. 1, and is carried in the direction of the arrow shown thereon, each spindle being tilted and rotated as it reaches a position over the tank 67 in order to dip the ware carried thereon, the speed of rotation being increased as the spindle is tilted back toward normal position and this increased speed of rotation being continued throughout the length of the belt 115 after which, the glaze coating having been uniformly distributed over the ware and the surplus glaze removed therefrom, each piece of ware continues to travel without rotation until approaching the point C, at which time the glaze coating is sufficiently dried to permit removal of the ware and insertion of a new piece of bisque ware into each chuck or head.

As the chains 124 are driven in unison with the chain 13, the shields 145 will move in unison with the spindles, shielding the ware from surplus glaze thrown off by adjacent pieces of ware throughout the dipping and spinning or rotating operations.

It has been found by experience that with the use of the improved glazing machine ware is not only glazed much more rapidly and economically than is possible under present practice but a more uniform and even coating of glaze is formed upon each piece of ware than is possible by the usual method of dipping.

Although the invention has been described as more particularly adapted for glazing semi-porcelain or china ware, it may be used for applying a liquid coating upon other materials or articles, such for instance as the coating of pressed or stamped sheet metal ware or articles with a vitreous enamel or the like.

We claim:

1. A glazing machine including an endless carrier, a plurality of spaced spindles carried by said carrier, a chuck upon each spindle for holding ware to be glazed, a tank for containing liquid material, means for tilting each spindle at a predetermined point to dip the ware carried thereby into the tank, and means for rotating each spindle as it is tilted and for increasing the speed of rotation during the dipping operation.

2. A glazing machine including an endless carrier, a plurality of spaced spindles carried by said carrier, a chuck upon each spindle for holding ware to be glazed, a tank for containing liquid material, means for tilting each spindle at a predetermined point to dip the ware carried thereby into the tank, and means for rotating each spindle as it is tilted and for continuing the rotation at a different speed for a predetermined time thereafter.

3. A glazing machine including an endless carrier, a plurality of spaced spindles carried by said carrier, a chuck upon each spindle for holding ware to be glazed, a tank for containing liquid material, means for tilting each spindle at a predetermined point to dip the ware carried thereby into the tank, and means for rotating each spindle as it is tilted and for increasing the speed of rotation for a predetermined time thereafter.

4. A glazing machine including an endless carrier, a plurality of spaced spindles carried by said carrier, a chuck upon each spindle for holding ware to be glazed, a tank for containing liquid material, means for tilting each spindle at a predetermined point to dip the ware carried thereby into the tank, means for rotating each spindle as it is tilted, and shields positioned between said spindles during the rotation of the spindles.

5. A glazing machine including an endless carrier, a plurality of spaced spindles carried by said carrier, a chuck upon each spindle for holding ware to be glazed, a tank for containing liquid material, means for tilting each spindle at a predetermined point to dip the ware carried thereby into the tank, means for rotating each spindle as it is tilted and for a predetermined time thereafter, and shields positioned between said spindles during the rotation of the spindles.

6. A glazing machine including an endless carrier, a plurality of spaced spindles carried by said carrier, a chuck upon each spindle for holding ware to be glazed, means for glazing each piece of ware with liquid material at a predetermined point, and means for rotating each spindle during the glazing operation and for increasing the speed of rotation for a predetermined time thereafter.

7. A glazing machine including an endless carrier, a plurality of spaced spindles carried by said carrier, a chuck upon each spindle for holding ware to be glazed, a pulley upon each spindle, a tank for containing liquid material, means for tilting each spindle at a predetermined point to dip the ware carried thereby into the tank, and a continuously moving endless belt adapted to be engaged by said pulley when the spindle is tilted for rotating the spindle during the dipping operation and a second continuously moving endless belt adapted to be engaged by said pulley immediately after the dipping operation to rotate the spindle at increased speed.

8. A glazing machine including an endless carrier, a plurality of spaced spindles carried by said carrier, a chuck upon each spindle for holding ware to be glazed, a pulley upon each spindle, a tank for containing liquid material, means for tilting each spindle at a predetermined point to dip the ware carried thereby into the tank, a continuously moving endless belt adapted to be engaged by each pulley when the spindle is tilted for rotating the spindle during the dipping operation, and means for increasing the speed of the belt after each pulley engages the belt.

9. A glazing machine including an endless carrier, a plurality of spaced spindles carried by said carrier, a chuck upon each spindle for holding ware to be glazed, a pulley upon each spindle, a tank for containing liquid material, means for tilting each spindle at a predetermined point to dip the ware carried thereby into the tank, a continuously moving endless belt adapted to be engaged by each pulley when the spindle is tilted for rotating the spindle during the dipping operation, means for increasing the speed of the belt after each pulley engages the belt, and a second belt continuously rotating at the maximum speed of the first named belt and adapted to be engaged by each pulley after the dipping operation.

10. A glazing machine including an endless carrier, a plurality of spaced spindles carried by said carrier, a chuck upon each spindle for holding ware to be glazed, a tank for containing liquid material, means for tilting each spindle at a predetermined point to dip the ware carried thereby into the tank, means for rotating each spindle as it is tilted, a second endless carrier, and shields carried by said last named endless carrier and positioned between said spindles during the rotation of the spindles.

11. A glazing machine including an endless carrier, a plurality of spaced spindles carried by said carrier, a chuck upon each spindle for holding ware to be glazed, a tank for containing liquid material, means for tilting each spindle at a predetermined point to dip the ware carried thereby into the tank, means for rotating each spindle as it is tilted and for a predetermined time thereafter, a second endless carrier, and shields carried by said last named endless carrier and positioned between said spindles during the rotation of the spindles.

12. A glazing machine including an endless carrier, a plurality of spaced spindles carried by said carrier, a chuck upon each spindle for holding ware to be glazed, a tank for containing liquid material, means for tilting each spindle at a predetermined point to dip the ware carried thereby into the tank, means for rotating each spindle as it is tilted and for increasing the speed of rotation for a predetermined time thereafter, a second endless carrier, and shields carried by said last named endless carrier and positioned between said spindles during the rotation of the spindles.

13. A glazing machine including an endless carrier, a plurality of spaced spindles carried by said carrier, a chuck upon each spindle for holding ware to be glazed, a tank for containing liquid material, a tilting frame adjacent to said tank, means for operating said frame to tilt each spindle in order to dip the ware carried thereby into the tank, and means carried by said tilting frame for rotating each spindle during the dipping operation.

14. A glazing machine including an endless carrier, a plurality of spaced spindles carried by said carrier, a chuck upon each spindle for holding ware to be glazed, a pulley upon each spindle, a tank for containing liquid material, a tilting frame adjacent to said tank, means for operating said frame to tilt each spindle in order to dip the ware carried thereby into the tank, and a continuously moving endless belt carried by the tilting frame and arranged to engage said pulley when the frame is tilted to rotate each spindle during the dipping operation.

15. A glazing machine including an endless carrier, a plurality of spaced spindles carried by said carrier, a chuck upon each spindle for holding ware to be glazed, a tank for containing liquid material, a tilting frame adjacent to said tank, means for operating said frame to tilt each spindle in order to dip the ware carried thereby into the tank, means carried by said tilting frame for rotating each spindle during the dipping operation, and means for increasing the speed of rotation of the spindle during the operation of the tilting frame.

16. A glazing machine including an endless carrier, a plurality of spaced spindles carried by said carrier, a chuck upon each spindle for holding ware to be glazed, a pulley upon each spindle, a tank for containing liquid material, a tilting frame adjacent to said tank, means for operating said frame to tilt each spindle in order to dip the ware carried thereby into the tank, a continuously moving endless belt carried by the tilting frame and arranged to engage said pulley when the frame is tilted to rotate each spindle during the dipping operation, and means for increasing the speed of said endless belt during the operation of the tilting frame.

17. A glazing machine including an endless carrier, a plurality of spaced spindles carried by said carrier, a chuck upon each spindle for holding ware to be glazed, a pulley upon each spindle, a tank for containing liquid material, a tilting frame adjacent to said tank, means for operating said frame to tilt each spindle in order to dip the ware carried thereby into the tank, a continuously moving endless belt carried by the tilting frame and arranged to engage said pulley when the frame is tilted to rotate each spindle during the dipping operation, means for increasing the speed of said endless belt during the operation of the tilting frame, a second endless belt beyond the tilting frame for engagement with the pulleys upon the spindles after the dipping operation, and means for moving said last named belt at a speed equal to the maximum speed of the first named belt.

18. A glazing machine including an endless carrier, a plurality of spaced spindles carried by said carrier, a chuck upon each spindle for holding ware to be glazed, a tank for containing liquid material, a normally upright stem upon each spindle, a guide track in which said stems move, a cut-out portion in the guide track adjacent to said tank, a movable section of track in said cut-out, means for moving said movable section of track to tilt each spindle in order to dip the ware carried thereby into the tank, and means for rotating each spindle during the dipping operation.

19. A glazing machine including an endless carrier, a plurality of spaced spindles carried by said carrier, a chuck upon each spindle for holding ware to be glazed, a pulley upon each spindle, a tank for containing liquid material, means for tilting each spindle at a predetermined point to dip the ware carried thereby into the tank, a continuously moving endless belt adapted to be engaged by said pulley when the spindle is tilted for rotating the spindle during the dipping operation, and a second continuously rotating belt adapted to be engaged by each pulley after the dipping operation.

20. A glazing machine including an endless carrier, a plurality of spaced spindles carried by said carrier, a chuck upon each spindle for holding ware to be glazed, a pulley upon each spindle, a tank for containing liquid material, means for tilting each spindle at a predetermined point to dip the ware carried thereby into the tank, a continuously moving endless belt adaptd to be engaged by said pulley when the spindle is tilted for rotating the spindle during the dipping operation, and a second continuously rotating belt moving at a greater speed than the first named belt and adapted to be engaged by each pulley after the dipping operation.

ARTHUR H. VAUGHAN.
RAY C. OYSTER.